US008716377B2

(12) United States Patent  (10) Patent No.: US 8,716,377 B2
Taden et al.  (45) Date of Patent: May 6, 2014

(54) POLYMERIZABLE COMPOSITION

(75) Inventors: Andreas Taden, Duesseldorf (DE);
Stefan Kreiling, Duesseldorf (DE);
Rainer Schoenfeld, Duesseldorf (DE);
Lothar Unger, Oberhausen (DE)

(73) Assignee: Henkel AG & Co. KGaA, Duesseldorf (DE)

(*) Notice: Subject to any disclaimer, the term of this patent is extended or adjusted under 35 U.S.C. 154(b) by 297 days.

(21) Appl. No.: 12/942,301

(22) Filed: Nov. 9, 2010

(65) Prior Publication Data

US 2011/0112235 A1  May 12, 2011

Related U.S. Application Data

(63) Continuation of application No. PCT/EP2009/054943, filed on Apr. 24, 2009.

(30) Foreign Application Priority Data

May 9, 2008 (DE) .................... 10 2008 023 076

(51) Int. Cl.
*C08K 5/34* (2006.01)
(52) U.S. Cl.
USPC ................ 524/100; 524/502; 525/186
(58) Field of Classification Search
USPC .................. 524/100, 502; 525/186
See application file for complete search history.

(56) References Cited

U.S. PATENT DOCUMENTS

| 4,419,496 | A | 12/1983 | Henton et al. |
| 4,607,091 | A | 8/1986 | Schreiber |
| 4,778,851 | A | 10/1988 | Henton et al. |
| 4,806,267 | A | 2/1989 | Culbertson et al. |
| 5,021,484 | A | 6/1991 | Schreiber et al. |
| 5,200,452 | A | 4/1993 | Schreiber |
| 5,443,911 | A | 8/1995 | Schreiber et al. |
| 5,445,911 | A | 8/1995 | Russell et al. |
| 5,543,516 | A | 8/1996 | Ishida |
| 5,902,535 | A | 5/1999 | Burgess et al. |
| 5,981,659 | A | 11/1999 | Geck et al. |
| 6,111,015 | A | 8/2000 | Eldin et al. |
| 6,147,142 | A | 11/2000 | Geck et al. |
| 6,180,693 | B1 | 1/2001 | Tang et al. |
| 6,207,786 | B1 | 3/2001 | Ishida et al. |
| 7,022,777 | B2 | 4/2006 | Davis et al. |
| 7,157,509 | B2 | 1/2007 | Li et al. |
| 2002/0007022 | A1 | 1/2002 | Oosedo et al. |
| 2003/0018131 | A1 | 1/2003 | Davis et al. |
| 2004/0068084 | A1 | 4/2004 | Hwang et al. |
| 2004/0261660 | A1 | 12/2004 | Li et al. |
| 2005/0042961 | A1 | 2/2005 | Lehmann et al. |
| 2007/0087202 | A1 | 4/2007 | Simmons et al. |
| 2007/0129509 | A1* | 6/2007 | Li et al. .................. 525/526 |
| 2008/0161494 | A1* | 7/2008 | Lee et al. .................. 525/66 |

FOREIGN PATENT DOCUMENTS

CN 1451679 10/2003

| DE | 4121652 | 1/1993 |
| DE | 19628142 | 1/1998 |
| DE | 19628143 | 1/1998 |
| EP | 818471 | 1/1998 |
| EP | 1380607 | 1/2004 |
| EP | 1623533 | 2/2006 |
| JP | 102003082117 | 3/2003 |
| JP | 2005-213301 | 8/2005 |
| WO | WO 98/02466 | 1/1998 |
| WO | WO 03/042196 | 5/2003 |
| WO | WO 03/048235 | 6/2003 |
| WO | WO2004/098126 | 11/2004 |
| WO | WO 2004/108825 | 12/2004 |
| WO | WO 2005/000955 | 1/2005 |
| WO | WO 2005/019291 | 3/2005 |
| WO | WO2007/064801 | 6/2007 |
| WO | WO2008/060545 | 5/2008 |
| WO | WO2008/076244 | 6/2008 |

OTHER PUBLICATIONS

International Search Report issued in connection with International Patent Application No. PCT/EP2009/054943 mailed Sep. 2, 2009.
International Search Report issued against International Patent Application No. PCT/US2007/023859 on Mar. 12, 2008.
K. Landfester, F. Tiarks, H.-P. Hentze, M. Antonietti « Polyaddition in miniemulsions : A new route to polymer dispersions » in Macromol. Chem. Phys. 201, 1-5 (2000) (Literature 1).
E.D.Sudol, M.S. Es-Aasser, in « Emulsion Polymerization and Emulsion Polymers », P.A. Lovell, M.S. El-Aasser, Eds., Chichester 1997, S. 699 (Literature 2).
K. Landfester Polyreactions in miniemulsions, Macromol. Rapid Commun., (2001) 22, 896-936 (Literature 3).
S. Rimdusit et al., "Development of new class of electronic packaging materials based on ternary system of benzoxazine, epoxy, and phenolic resin," Polymer, 41, 7941-49 (2000).
J. McGrath et al., "Synthesis and Characterization of Segmented Polyimide-Polyorganosiloxane Copolymers", Advances in Polym. Sci., 140, pp. 61-105 (1999).
J. Jang et al., "Performance Improvement of Rubber Modified Polybenzoxazine", J. Appl. Polym. Sci 67, 1-10 (1998).
Burke et al., J. Org. Chem., 30(10), 3423 (1965).
T. Gietl, H. Lengsfeld "The efficiency of various toughening agents in novel phenolic type thermoset resin systems", Journal of Material Science, (2006), 41, 8226-8243 (Literature 4).

* cited by examiner

*Primary Examiner* — Ling Choi
*Assistant Examiner* — Wenwen Cai
(74) *Attorney, Agent, or Firm* — Steven C. Bauman

(57) ABSTRACT

The present invention relates to a polymerizable composition comprising at least one polymerizable benzoxazine compound and core-shell particles, where the core of the core-shell particles comprises at least one (co)polymer of at least one ethylenically unsaturated monomer (A) and the shell of the core-shell particles comprises at least one crosslinked (co)polymer of at least one ethylenically unsaturated monomer (B), where the ethylenically unsaturated monomer (B) encompasses at least one aromatic group. The present invention further relates to adhesives, sealants or coatings, which encompass the polymerizable composition of the invention, and also to the polymerization products of this composition. The present invention further relates to a process for the production of the polymerizable composition of the invention.

16 Claims, No Drawings

POLYMERIZABLE COMPOSITION

The present invention relates to a polymerizable composition, comprising at least one polymerizable benzoxazine compound and core-shell particles, wherein the core of the core-shell particle comprises at least one (co)polymer of an ethylenically unsaturated monomer (A) and the shell of the core-shell particle comprises at least one crosslinked (co)polymer of at least one ethylenically unsaturated monomer (B), wherein the ethylenically unsaturated monomer (B) includes at least one aromatic group. Further subject matters of the present invention are adhesives, sealants or coatings that contain the polymerizable composition according to the invention, as well as the polymerization product of said composition. The present invention additionally relates to a process for manufacturing the polymerizable composition according to the invention.

Epoxy-based resin systems have been successfully used for a long time in the aeronautical, automotive or electronics industries as adhesives, sealants or for coating surfaces or employed as resin systems with a range of different materials for manufacturing composites.

Benzoxazine-based resin systems generally exhibit a high glass transition temperature and are characterized by their good electrical properties and their positive flame retardant behavior.

Mixtures of epoxy resins and benzoxazine resins are described for example in the U.S. Pat. Nos. 4,607,091, 5,021,484 and 5,200,452. The mixtures of the cited resin systems are characterized by their advantageous processability because the epoxy resin decisively reduces the viscosity of the composition. The cited resin systems can be employed in the electronic industry due to inter alia the favorable processability even with high filler contents. However, it is disadvantageous that the addition of epoxy resins significantly increases somewhat the curing temperature of the benzoxazine-based resin system.

After curing, benzoxazine-based resin systems are characterized by a high mechanical strength. In general, the cited materials have the disadvantage that they are very brittle and consequently must be impact-modified for the majority of applications.

Benzoxazine-based resin systems with an improved impact resistance modification are also known. Thus, the U.S. Pat. No. 7,157,509 describes thermally curable benzoxazine-based compositions that contain acrylonitrile-butadiene copolymers as tougheners, wherein the cited copolymer possesses terminal secondary amino groups.

In addition, the international patent application WO 2007/064801 describes a curable composition, comprising benzoxazine-based resin systems and certain adducts as the toughener. The cited adducts are manufactured in two steps. In a first step a first hydroxyl-containing compound reacts with an isocyanate-containing compound and a phenolic compound; in a second step the reaction product reacts further with epoxy-containing compounds to yield the cited adduct.

Despite the prior art, there is still a need for novel and advantageous tougheners for benzoxazine-based resin systems. Accordingly, the object of the present invention was the provision of polymerizable benzoxazine-based compositions with an improved impact resistance, comprising tougheners, wherein said tougheners can be easily formulated and have a good compatibility with the benzoxazine matrix.

It has now been surprisingly found that a benzoxazine-based composition, containing certain core-shell particles as the toughener, can be impact modified in an effective manner, wherein said core-shell particles can be easily formulated and have a good compatibility with the benzoxazine matrix.

Accordingly, the subject matter of the present invention is a polymerizable composition, comprising at least one polymerizable benzoxazine compound and core-shell particles, wherein the core of the core-shell particle comprises at least one (co)polymer of an ethylenically unsaturated monomer (A) and the shell of the core-shell particle comprises at least one crosslinked (co)polymer of at least one ethylenically unsaturated monomer (B), wherein the ethylenically unsaturated monomer (B) includes at least one aromatic group.

A further subject matter of the present invention is a process for the manufacture of the polymerizable composition according to the invention.

The polymerizable composition according to the present invention is particularly suitable for manufacturing adhesives, sealants or coatings, as well as for manufacturing composites that contain a layer or a bundle of fibers, such as for example carbon fibers.

Accordingly, adhesives, sealants or coatings, which contain the polymerizable composition according to the invention as the polymerization product of the inventive composition and its manufacture, are likewise a subject matter of the present invention, wherein said polymerization product contains a layer or a bundle of fibers, such as for example carbon fibers.

The polymerizable benzoxazine compound of the present invention is a monomer, oligomer or polymer, which contains at least one benzoxazine group. Preferred monomers can preferably contain up to four benzoxazine groups, wherein both individual monomers as well as mixtures of two or more monomers can be used as the benzoxazine compound.

Some polymerizable benzoxazine compounds according to the invention which contain up to four benzoxazine groups are listed below.

Suitable benzoxazine compounds are preferably represented by formula (B-I),

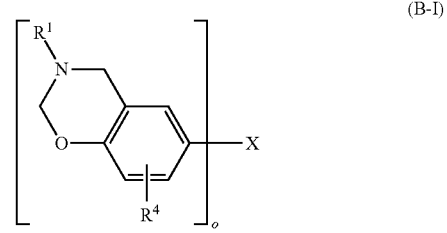

(B-I)

wherein o is a whole number between 1 and 4, X is selected from the group consisting of alkyl (for o=1), alkylene (for o=2 to 4), oxygen (for o=2), thiol (for o=1), sulfur (for o=2), sulfoxide (for o=2), sulfone (for o=2) and a direct, covalent bond (for o=2), $R^1$ is selected from the group consisting of hydrogen, alkyl, alkenyl and aryl and $R^4$ is selected from the group consisting of hydrogen, halogen, alkyl and alkenyl, or $R^4$ is a divalent group that makes a corresponding naphthoxazine structure from the benzoxazine structure.

Particularly preferred structures according to formula (B-I) are represented by formula (B-II),

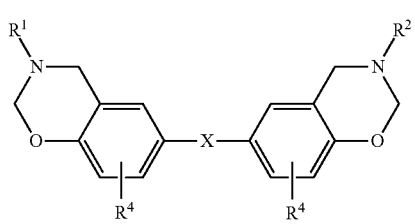
(B-II)

wherein X is selected from the group consisting of $CH_2$, $C(CH_3)_2$, O, C=O, S, S=O, O=S=O and a direct, covalent bond, $R^1$ and $R^2$ are the same or different and each selected from the group consisting of hydrogen, alkyl, in particular methyl, ethyl, n-propyl, i-propyl, n-butyl or i-butyl, alkenyl, in particular allyl, and aryl and the substituents $R^4$ are the same or different and are each selected from the group consisting of hydrogen, halogen, alkyl and alkenyl, or each $R^4$ is a divalent group that makes a corresponding naphthoxazine structure from the benzoxazine structure.

Inventive benzoxazine compounds according to formula (B-II) are for example benzoxazines according to formula (B-III) to (B-VI),

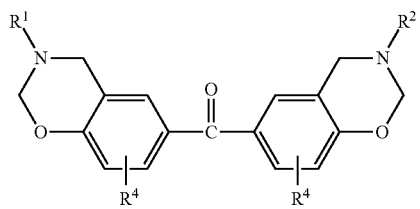
(B-III)

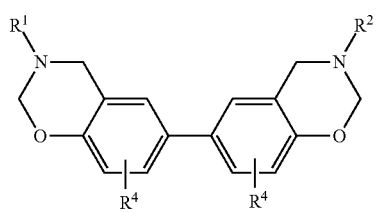
(B-IV)

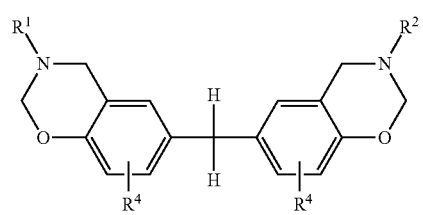
(B-V)

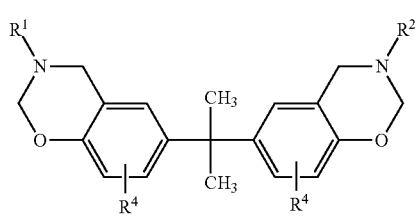
(B-VI)

wherein $R^1$, $R^2$ and $R^4$ are as defined above.

Inventive benzoxazine compounds are in addition compounds of the general formula (B-VII),

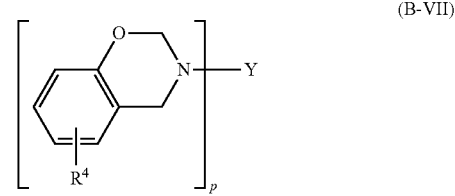
(B-VII)

wherein p=2 and Y is selected from the group consisting of biphenyl (for p=2), diphenylmethane (for p=2), diphenylisopropane (for p=2), diphenyl sulfide (for p=2), diphenyl sulfoxide (for p=2), diphenyl sulfone (for p=2), diphenyl ketone (for p=2) and $R^4$ is selected from the group consisting of hydrogen, halogen, alkyl and alkenyl, or $R^4$ is a divalent group that makes a corresponding naphthoxazine structure from the benzoxazine structure.

Inventive benzoxazine compounds are in addition compounds of the general formula (B-VIII) to (B-X),

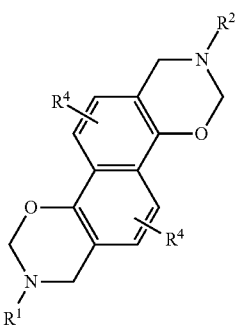
(B-VIII)

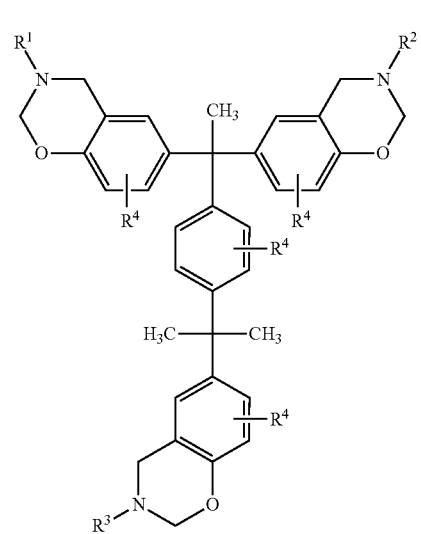
(B-IX)

wherein $R^1$, $R^2$ and $R^4$ are as defined above and $R^3$ is defined as $R^1$ or $R^2$.

In the context of the present invention, exemplary suitable benzoxazine compounds are the following compounds:

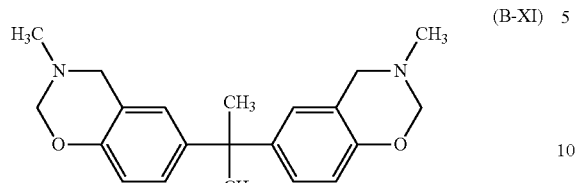
(B-XI)

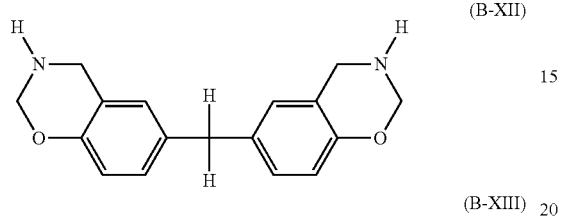
(B-XII)

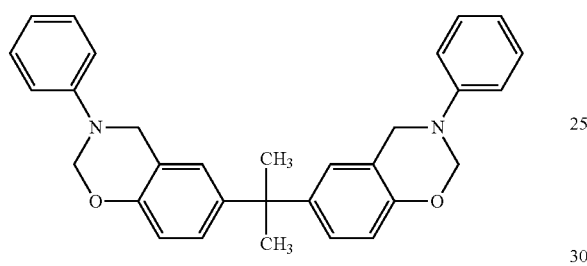
(B-XIII)

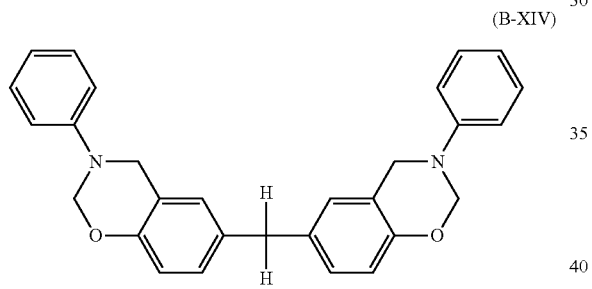
(B-XIV)

In the context of the present invention, suitable benzoxazine compounds are monofunctional as well as multifunctional benzoxazine compounds. Monofunctional benzoxazine compounds are understood to mean those compounds that contain only one benzoxazine group, whereas multifunctional benzoxazine compounds contain more than one benzoxazine group and can preferably comprise up to four benzoxazine groups.

For example, monofunctional benzoxazine compounds can be described by the general formula (B-XIX),

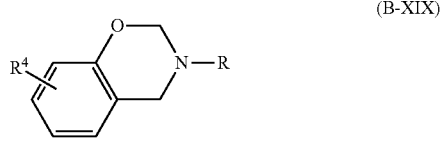
(B-XIX)

wherein R is selected from the group consisting of alkyl, in particular methyl, ethyl, n-propyl, i-propyl, n-butyl, i-butyl, alkenyl, in particular allyl, and aryl, wherein each of the cited groups is optionally substituted and $R^4$ is selected from the group consisting of hydrogen, halogen, alkyl and alkenyl, or $R^4$ is a divalent group that makes a corresponding naphthoxazine structure from the benzoxazine structure.

Preferred monofunctional benzoxazine compounds are described for example by the general formula (B-XX),

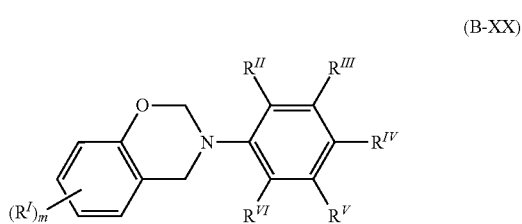
(B-XX)

wherein $R^1$ is selected from the group consisting of alkyl and alkenyl, wherein each of the cited groups is optionally substituted or interrupted by one or more O, N, S, C=O, COO or NHC=O or by one or more aryl groups, m is a whole number between 0 and 4 and $R^{II}$, $R^{III}$, $R^{IV}$, $R^V$ and $R^{VI}$ independently of one another are selected from the group consisting of hydrogen, alkyl and alkenyl, wherein each alkyl or alkenyl group is optionally substituted or interrupted by one or more O, N, S, C=O, COO, or NHC=O or by one or more aryl groups. In the context of the present invention, exemplary suitable benzoxazine compounds are the following compounds (B-XXI) and (B-XXII),

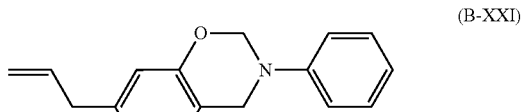
(B-XXI)

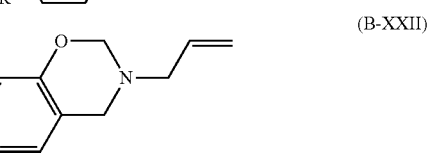
(B-XXII)

wherein R is as described above.

In a particularly preferred embodiment of the invention, the benzoxazine compound is selected from N-alkyl- or N-alkenyl-benzoxazine compounds or from their mixtures. In the context of the invention, N-alkyl- or N-alkenyl-benzoxazine compounds are understood to mean those compounds that contain at least one benzoxazine group, preferably two benzoxazine groups and in which the N atom of the oxazine ring of at least one, preferably of each benzoxazine group, carries an alkyl or alkenyl group.

N-alkyl- or N-alkenyl-benzoxazine compounds are particularly preferred, as the core-shell particles according to the invention can be particularly easily formulated with, and exhibit a good compatibility with said benzoxazine compounds.

The core-shell particles according to the invention are essentially homogeneously dispersed in the polymerization products, especially of the N-alkyl- or N-alkenyl-benzoxazine compounds, and demonstrate a very low tendency to coagulation. A particularly effective impact modification of said benzoxazines is achieved in this way.

Particularly preferred N-alkyl- or N-alkenyl-benzoxazine compounds are preferably represented by formula (B-XXIII),

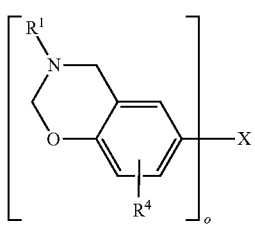

(B-XXIII)

wherein o is a whole number between 1 and 4, X is selected from the group consisting of alkyl (for o=1), alkylene (for o=2 to 4), thiol (for o=1), thioether (for o=2), sulfoxide (for o=2), sulfone (for o=2) and a direct, covalent bond (for o=2), $R^1$ is selected from the group consisting of alkyl and alkenyl and $R^4$ is selected from the group consisting of hydrogen, halogen, alkyl and alkenyl, or R4 is a divalent group that makes a corresponding naphthoxazine structure from the benzoxazine structure.

Particularly preferred structures according to formula (B-XXIII) are represented by formula (B-XXIV) and (B-XXV),

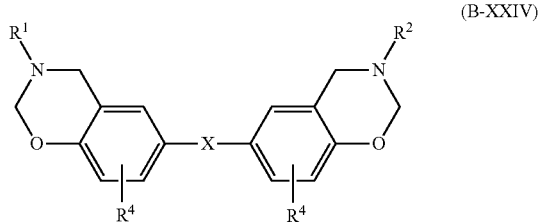

(B-XXIV)

wherein X is selected from the group consisting of $CH_2$, $C(CH_3)_2$, $CO=S$, $S=O$, $O=S=O$ and a direct, covalent bond, $R^1$ and $R^2$ are the same or different and each selected from the group consisting of alkyl, in particular methyl, ethyl, n-propyl, i-propyl, n-butyl or i-butyl and alkenyl, in particular allyl, and the substituents $R^4$ are the same or different and are each selected from the group consisting of hydrogen, halogen, alkyl and alkenyl, or each $R^4$ is a divalent group that makes a corresponding naphthoxazine structure from the benzoxazine structure;

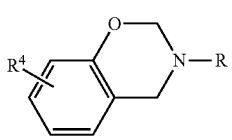

(B-XXV)

and wherein R is selected from the group consisting of alkyl, in particular methyl, ethyl, n-propyl, i-propyl, n-butyl, i-butyl and alkenyl, in particular allyl, wherein each of the cited groups is optionally substituted and $R^4$ is selected from the group consisting of hydrogen, halogen, alkyl and alkenyl, or $R^4$ is a divalent group that makes a corresponding naphthoxazine structure from the benzoxazine structure.

In the context of the present invention, benzoxazine compounds are commercially available and are marketed by inter alia Huntsman Advanced Materials; Georgia-Pacific Resins, Inc. and Shikoku Chemicals Corporation, Chiba, Japan.

Notwithstanding this, the inventive benzoxazine compounds of the present invention can also be obtained by treating a phenolic compound, for example Bisphenol A, Bisphenol F, Bisphenol S or thiophenol with an aldehyde, for example formaldehyde, in the presence of a primary alkyl- or arylamine.

Suitable manufacturing processes are described for example in U.S. Pat. No. 5,543,516, in particular disclosed in the examples 1 to 19 in columns 10 to 14, wherein the reaction time of the relevant reaction can take some minutes to some hours, depending on the concentration, reactivity and reaction temperature. Further possibilities for manufacturing the inventive benzoxazine compounds of the present invention can be found in Burke et al. J. Org. Chem., 30 (10), 3423 (1965) and in the U.S. Pat. Nos. 4,607,091, 5,021,484 and 5,200,452.

Each of the inventive benzoxazine compounds shown above can also partially contain opened ring structures, wherein the opened ring structure is preferably obtained by formally breaking the covalent bond between A and A' or between B and B' (see formula B-O).

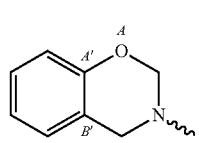

(B-O)

In the context of the present invention, the ring-opened structures are also valid inventive benzoxazine compounds, especially as ring-opened benzoxazine compounds.

The polymerizable composition of the present invention can comprise only one benzoxazine compound or a mixture of different benzoxazine compounds. Thus for example, mixtures of mono- and multifunctional benzoxazine compounds are just as preferred as mixtures of different N-alkyl- or N-alkenylbenzoxazine compounds or mixtures of at least one N-alkylbenzoxazine compound and at least one N-alkenylbenzoxazine compound.

In a preferred embodiment of the invention, the polymerizable composition comprises at least one polymerizable benzoxazine compound or a mixture of different polymerizable benzoxazine compounds in amounts of 50 to 99 wt. %, preferably 70 to 95 wt. % and most preferably 80 to 90 wt. %, each based on the total amount of the preparation.

The polymerization of the polymerizable benzoxazine compound or the mixture of different polymerizable benzoxazine compounds can take place at increased temperatures according to a self-initiating mechanism or by adding cationic initiators. Suitable exemplary cationic initiators are Lewis acids or other cationic initiators, such as for example metal halides, organometallic reagents, such as metalloporphyrins, methyl tosylates, methyl triflates or trifluorosulfonic acids. Basic reagents can also be used for initiating the polymerization of the polymerizable benzoxazine compound or the mixture of different polymerizable benzoxazine compounds. Suitable exemplary reagents can be selected from imidazole or imidazole derivatives.

In a preferred embodiment, the polymerizable composition contains only one or a plurality of benzoxazine compounds as the polymerizable resin component. For certain application purposes, however, it can be advantageous for the polymerizable composition to additionally contain other compounds beside the cited benzoxazine compound. Suitable compounds can be selected for example from the group of the epoxy resins, polyurethane resins, polyester resins, polyamide resins or phenolic resins or from any of their mixtures.

In the context of the present invention, an "epoxy resin" is understood to mean a resin composition that is formed on the basis of epoxide compounds or epoxide-containing compounds. In a preferred embodiment of the invention, the epoxide compounds or epoxide-containing compounds of the epoxy resin system of the polymerizable preparation can include both oligomeric as well as monomeric epoxide compounds as well as epoxides of the polymeric type, and can be aliphatic, cycloaliphatic, aromatic or heterocyclic compounds. In the context of the present invention, exemplary suitable epoxy resin systems are preferably selected from epoxy resins of the bisphenol-A type, epoxy resins of the bisphenol-S type, epoxy resins of the bisphenol-F type, epoxy resins of the phenol-novolak type, epoxy resins of the cresol-novolak type, epoxidized products of numerous dicyclopentadiene-modified phenol resins, obtained by treating dicyclopentadiene with numerous phenols, epoxidized products of 2,2',6,6'-tetramethylbiphenol, aromatic epoxy resins such as epoxy resins with naphthalene basic structure and epoxy resins with fluorine basic structure, aliphatic epoxy resins such as neopentyl glycol diglycidyl ether and 1,6-hexane diol diglycidyl ether, alicyclic epoxy resins such as 3,4-epoxycyclohexylmethyl-3,4-epoxycyclohexane carboxylate and bis(3,4-epoxycyclohexyl) adipate, and epoxy resins with a heterocycle such as triglycidyl isocyanurate.

In particular, the epoxy resins include for example the reaction product from Bisphenol A and epichlorohydrin, the reaction product of phenol and formaldehyde (Novolak resins) and epichlorohydrin, glycidyl esters as well as the reaction product from epichlorohydrin and p-aminophenol. Further preferred epoxy resins that are commercially available include in particular octadecylene oxide, epichlorohydrin, styrene oxide, vinylcyclohexene oxide, glycidol, glycidyl methacrylate, diglycidyl ether of bisphenol A (e.g. those obtainable under the trade names "Epon 828", "Epon 825", "Epon 1004" and "Epon 1010" from Hexion Specialty Chemicals Inc., "DER-331", "DER-332", "DER-334", "DER-732" and "DER-736" from Dow Chemical Co.), vinylcyclohexene dioxide, 3,4-epoxycyclohexylmethyl-3,4-epoxycyclohexene carboxylate, bis(3,4-epoxy-6-methylcyclohexylmethyl) adipate, bis(2,3-epoxycyclopentyl)ether, aliphatic epoxide, modified with polypropylene glycol, dipentene dioxide, epoxidized polybutadiene (e.g. Krasol products from Sartomer), silicone resins containing epoxide functionality, flame-retardant epoxy resins (e.g. "DER-580", a brominated epoxy resin of the Bisphenol type, which can be obtained from Dow Chemical Co.), 1,4-butane diol diglycidyl ether of a phenol-formaldehyde Novolak (e.g. "DEN-431" and "DEN-438" from Dow Chemical Co.), as well as resorcinol diglycidyl ether (e.g. "Kopoxite" from Koppers Company Inc.), bis(3,4-epoxycyclohexyl) adipate, 2-(3,4-epoxycyclohexyl-5,5-spiro-3,4-epoxy)cyclohexane meta-dioxane, vinylcyclohexene monoxide, 1,2-epoxyhexadecane, alkyl glycidyl ethers such as e.g. C8-C10 alkyl glycidyl ether (e.g. "HELOXY Modifier 7" from Hexion Specialty Chemicals Inc.), C12-C14 alkyl glycidyl ether (e.g. "HELOXY Modifier 8" from Hexion Specialty Chemicals Inc.), butyl glycidyl ether (e.g. "HELOXY Modifier 61" from Hexion Specialty Chemicals Inc.), cresyl glycidyl ether (e.g. "HELOXY Modifier 62" from Hexion Specialty Chemicals Inc.), p-tert.-butylphenyl glycidyl ether (e.g. "HELOXY Modifier 65" from Hexion Specialty Chemicals Inc.), polyfunctional glycidyl ethers such as e.g. diglycidyl ether of 1,4-butane diol (e.g. "HELOXY Modifier 67" from Hexion Specialty Chemicals Inc.), diglycidyl ethers of neopentyl glycol (e.g. "HELOXY Modifier 68" from Hexion Specialty Chemicals Inc.), diglycidyl ethers of cyclohexane dimethanol (e.g. "HELOXY Modifier 107" from Hexion Specialty Chemicals Inc.), trimethylolethane triglycidyl ether (e.g. "HELOXY Modifier 44" from Hexion Specialty Chemicals Inc.), trimethylolpropane triglycidyl ether (e.g. "HELOXY Modifier 48" from Hexion Specialty Chemicals Inc.), polyglycidyl ethers of an aliphatic polyol (e.g. "HELOXY Modifier 84" from Hexion Specialty Chemicals Inc.), polyglycol diepoxide (e.g. "HELOXY Modifier 32" from Hexion Specialty Chemicals Inc.), Bisphenol F epoxides (e.g. "EPN-1138" or GY-281" from Huntsman Int. LLC), 9,9-bis-4-(2,3-epoxypropoxy)-phenylfluorenone (e.g. "Epon 1079" from Hexion Specialty Chemicals Inc.).

Further preferred commercially available compounds are e.g. selected from Araldite® 6010, Araldite® GY-281™, Araldite® ECN-1273, Araldite® ECN-1280, Araldite® MY-720, RD-2 from Huntsman Int. LLC; DEN™ 432, DEN™438, DEN™ 485 from Dow Chemical Co., Epon™ 812, 826, 830, 834, 836, 871, 872, 1001, 1031 etc. from Hexion Specialty Chemicals Inc. and HPT™ 1071, HPT™ 1079 also from Hexion Specialty Chemicals Inc., in addition as the Novolak resins e.g. Epi-Rez™ 5132 from Hexion Specialty Chemicals Inc., ESCN-001 from Sumitomo Chemical, Quatrex 5010 from Dow Chemical Co., RE 305S from Nippon Kayaku, Epiclon™ N673 from DaiNippon Ink Chemistry or Epicote™ 152 from Hexion Specialty Chemicals Inc.

In a preferred embodiment, the inventive polymerizable preparation contains a mixture of a plurality of the cited epoxy resins.

Preferably, the content of the epoxy resin or the mixture of a plurality of epoxy resins in the total amount of the polymerizable preparation is 5 to 50 wt. %, particularly preferably 10 to 30 wt. % and most preferably 20 to 25 wt. %.

The polymerizable composition according to the invention further contains the previously cited core-shell particles as the additional component, wherein the core of the core-shell particle comprises at least one (co)polymer of at least one ethylenically unsaturated monomer (A) and the shell of the core-shell particle comprises at least one crosslinked (co)polymer of at least one ethylenically unsaturated monomer (B), wherein the ethylenically unsaturated monomer (B) contains at least one aromatic group.

In the context of the present invention, the term (co)polymer is understood to mean polymers as well as copolymers.

In the context of the present invention, the term "ethylenically unsaturated monomer" is understood to mean those monomers that possess at least one polymerizable carbon-carbon double bond, wherein said double bond can be present in mono-, di-, tri- or tetrasubstituted form.

In the context of the present invention, an ethylenically unsaturated monomer (B) that contains at least one aromatic group is called an ethylenically unsaturated aromatic monomer. Preferred ethylenically unsaturated aromatic monomers are preferably selected from vinylaromatic compounds or from aromatic esters of (meth)acrylic acids. In the context of the present invention, the term "(meth)acrylic acid" is understood to mean acrylic acids as well as methacrylic acids.

The aromatic esters of (meth)acrylic acids preferably contain aromatic or heteroaromatic groups, wherein the aromatic or heteroaromatic groups contain 5 to 10 carbon atoms, especially 6 carbon atoms, and said groups are each part of the alcohol that is used in an esterification reaction with acrylic acid or methacrylic acid for manufacturing the (meth)acrylic acid ester.

A particularly preferred alcohol in this context is benzyl alcohol.

Generally, the aromatic or heteroaromatic group can be bonded directly to the oxygen atom (—O—) of the ester group (—C(=O)—O—). Notwithstanding this, it is also possible for the aromatic or heteroaromatic group to be bonded to the to the oxygen atom (—O—) of the ester group (—C(=O)—O—) through a divalent linking group that contains 1 to 8 carbon atoms. Where possible, carbon atoms of the divalent linking group can be bonded to one another not only through covalent bonds, but also through divalent heteroatoms, for example selected from oxygen and/or sulfur.

Particularly preferred aromatic esters of (meth)acrylic acid are selected from compounds of the general formula (M-I),

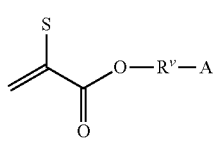

Formula (M-I)

wherein S is selected from hydrogen or methyl, RV stands for a covalent bond or a divalent linking group that contains 1 to 100 carbon atoms, and A is an aromatic or heteroaromatic group that is optionally substituted.

The divalent organic linking group $R^V$ preferably contains 2 to 50, particularly preferably 2 to 25 and especially 2 to 20 carbon atoms. In addition, the divalent organic linking groups $R^V$ can be selected from linear or branched, optionally substituted alkylene groups that contain 1 to 15 carbon atoms, wherein the alkylene groups are optionally interrupted by at least one heteroatom, selected from oxygen, sulfur or nitrogen.

In the context of the present invention, the term "interrupted" is understood to mean that in a divalent alkylene group, at least one non-terminal carbon atom of said group is replaced by a heteroatom, wherein the heteroatom is preferably selected from *—S—* (sulfur),*—O—* (oxygen), and *—$NR^B$— (nitrogen), wherein $R^a$ stands in particular for hydrogen or for a linear or branched, optionally substituted alkyl group containing 1 to 15 carbon atoms.

Preferred aromatic groups A are selected from phenyl or biphenyl, phenyl being preferred. The cited groups may also be substituted, wherein suitable substituents are selected from chloro, bromo, iodo, amino, hydroxyl, carboxyl, thiol, alkyl, alkenyl and alkynyl groups Preferred vinylaromatic compounds contain at least one aromatic or heteroaromatic group, wherein the aromatic or heteroaromatic group preferably contains 5 to 10 carbon atoms, especially 6 carbon atoms.

In the context of the present invention, particularly preferred ethylenically unsaturated aromatic monomers are selected from styrene, styrene derivatives (e.g. alpha-alkyl-styrenes, such as methylstyrene), vinyltoluene, phenoxyalkyl acrylates, methacrylates, such as e.g. phenylethyl methacrylate, phenyl methacrylate or benzyl methacrylate, or acrylates, such as e.g. phenyl acrylate or benzyl acrylate. Quite particularly preferred ethylenically unsaturated aromatic monomers (B) are styrene and/or benzyl (meth)acrylate, especially benzyl methacrylate.

Preferred ethylenically unsaturated monomers (A) contain both ethylenically unsaturated aromatic monomers as well as ethylenically unsaturated non-aromatic monomers, wherein the term for the ethylenically unsaturated aromatic monomer is understood to be in agreement with the abovementioned definition.

In a particularly preferred embodiment of the present invention, the ethylenically unsaturated aromatic monomer (A) is selected exclusively from ethylenically unsaturated non-aromatic monomers.

Examples of ethylenically unsaturated non-aromatic monomers are for example:

(i) esters of ethylenically unsaturated acids, such as for example their alkyl or cycloalkyl esters, wherein the alkyl or cycloalkyl esters can contain up to 20 carbon atoms. Particularly preferred alkyl esters are for example the methyl, ethyl, propyl, n-butyl, sec-butyl, tert-butyl, hexyl, ethylhexyl, stearyl and lauryl esters of various ethylenically unsaturated acids, preferably selected from the group consisting of acrylic acid, methacrylic acid, crotonic acid, ethacrylic acid, vinylphosphonic acid and vinylsulfonic acid. Particularly preferred cycloalkyl esters are for example the cyclohexyl, isobornyl, dicyclopentadienyl and tert-butylcyclohexyl esters of various ethylenically unsaturated acids, preferably selected from the group consisting of acrylic acid, methacrylic acid, crotonic acid, ethacrylic acid, vinylphosphonic acid and vinylsulfonic acid.

(ii) Monomers that contain at least one hydroxyl or hydroxymethylamino group per molecule, such as for example hydroxyalkyl esters of alpha, beta-unsaturated carboxylic acids, such as for example the hydroxyalkyl esters of acrylic acid, methacrylic acid and/or ethacrylic acid, wherein the hydroxyalkyl group can contain up to 20 carbon atoms. Suitable hydroxyalkyl esters are for example the 2-hydroxyethyl, 2-hydroxypropyl, 3-hydroxypropyl, 3-hydroxybutyl, 4-hydroxybutyl esters of acrylic acid, methacrylic acid and/or ethacrylic acid; esters of ethylenically unsaturated alcohols, such as e.g. allyl esters; reaction products of ethylenically unsaturated carboxylic acids with glycidyl esters of alpha-branched monocarboxylic acids that contain 5 to 18 carbon atoms;

(iii) Vinyl esters of alpha-branched monocarboxylic acids that contain 5 to 18 carbon atoms, such as for example the vinyl esters of monocarboxylic acids with the name Versatic® acid;

(iv) Cyclic and/or acyclic olefins, such as for example ethylene, propylene, but-1-ene, pent-1-ene, cyclohexene, cyclopentene, norbornene, butadiene, isoprene, cyclopentadiene and/or dicyclopentadiene;

(v) Amides of alpha,beta-unsaturated carboxylic acids, such as for example (meth)acrylamide, N-methyl-(meth)acrylamide, N,N-dimethyl-(meth)acrylamide, M-ethyl-(meth)acrylamide, N,N-diethyl-(meth)acrylamide, N-propyl-(meth)acrylamide, N,N-dipropyl-(meth)acrylamide, N-butyl-(meth)acrylamide, N,N-dibutyl-(meth)acrylamide and/or N,N-cyclohexyl-methyl-(meth)acrylamide;

(vi) Monomers that contain epoxy groups, such as for example the glycidyl esters of acrylic acid, methacrylic acid, ethacrylic acid, crotonic acid, maleic acid, fumaric acid and/or itaconic acid;

(vii) Nitriles, such as for example acrylonitrile or methacrylonitrile;

(viii) Vinyl compounds, for example selected from the group consisting of vinyl halides, such as for example vinyl chloride, vinyl fluoride, vinylidene dichloride, vinylidene difluoride; vinylamides, such as for example N-vinyl pyrrolidone; vinyl ethers, such as for example n-propyl vinyl ether, isopropyl vinyl ether, n-butyl vinyl ether, isobutyl vinyl ether or vinyl cyclohexyl ether and vinyl esters, such as for example vinyl acetate, vinyl propionate and vinyl butyrate; and (ix) Allylic compounds, selected from the group consisting of allyl ethers and allyl esters, such as for example propyl allyl ether, butyl allyl ether, allyl acetate and allyl propionate.

Particularly preferred ethylenically unsaturated non-aromatic monomers are the non-aromatic $C_2$ to $C_8$ esters of methacrylic acid, such as for example ethyl (meth)acrylate, propyl (meth)acrylate, n-butyl (meth)acrylate, sec-butyl (meth)acrylate, tert-butyl (meth)acrylate and hexyl (meth)acrylate. In the context of the present invention, a quite particularly preferred ethylenically unsaturated non-aromatic monomer is n-butyl acrylate.

In a preferred embodiment of the invention, the ethylenically unsaturated monomer (A) is selected from ethylenically mono-unsaturated monomers. In a likewise preferred embodiment of the invention, the ethylenically unsaturated monomer (B) that contains an aromatic group is selected from ethylenically mono-unsaturated monomers that contain an aromatic group.

In the context of the present invention, ethylenically mono-unsaturated monomers are understood to mean those that exhibit only one carbon-carbon double bond.

As mentioned above, the shell of the core-shell particle comprises at least one crosslinked (co)polymer of at least one ethylenically unsaturated monomer (B) that contains at least one aromatic group. This crosslinked (co)polymer is called the shell (co)polymer in the following.

The fraction of the ethylenically unsaturated monomer (B) in the shell (co)polymer should be calculated such that the core-shell particles exhibit a good compatibility and dispersibility in the benzoxazine matrix.

In one embodiment of the invention, the shell of the core-shell particles comprises at least one crosslinked (co)polymer of at least one ethylenically unsaturated monomer (B) that contains at least one aromatic group, wherein the content of the at least one ethylenically unsaturated monomer (B) (in polymerized form) in the crosslinked (co)polymer is preferably at least 5 wt. %, at least 10 wt. %, at least 15 wt. %, at least 20 wt. %, at least 40 wt. %, at least 60 wt. %, at least 80 wt. % or at least 90 wt. %.

In one embodiment of the invention, the shell of the core-shell particles consist of a crosslinked (co)polymer of at least one ethylenically unsaturated monomer (B) that contains at least one aromatic group, wherein the content of the at least one ethylenically unsaturated monomer (B) (in polymerized form) in the crosslinked (co)polymer is preferably at least 5 wt. %, at least 10 wt. %, at least 15 wt. %, at least 20 wt. %, at least 40 wt. %, at least 60 wt. %, at least 80 wt. % or at least 90 wt. %.

The shell of the core-shell particles can also contain or consist of a homopolymer of an ethylenically unsaturated monomer (B) that carries at least one aromatic group.

In a preferred embodiment of the invention, the shell (co)polymer is therefore a homopolymer of an ethylenically unsaturated aromatic monomer, in particular a homopolymer of an ethylenically mono-unsaturated aromatic monomer, especially a homopolymer of vinylaromatic compounds or of aromatic esters of (meth)acrylic acids. A quite particularly preferred shell (co)polymer is a homopolymer of styrene or benzyl (meth)acrylate.

In so far as the shell (co)polymer is a homopolymer of an ethylenically unsaturated aromatic monomer, then the term "homopolymer" in the context of the present invention is preferably understood to mean those polymers that essentially consist of only one ethylenically unsaturated aromatic monomer, i.e. the percentage fraction of an ethylenically unsaturated aromatic monomer in the total amount of all monomers that form the polymer in question is at least 98%.

In a further preferred embodiment of the invention, the shell (co)polymer is a copolymer of at least two ethylenically unsaturated aromatic monomers, in particular a copolymer of at least two ethylenically, mono-unsaturated, aromatic monomers. A quite particularly preferred shell copolymer is a copolymer of styrene and benzyl (meth)acrylate, wherein the weight ratio between styrene and benzyl (meth)acrylate is preferably between 1:1 and 1:50, especially between 1:2 and 1:5.

Furthermore, in a most preferred embodiment of the invention, the shell of the core-shell particle consists only of a single crosslinked shell (co)polymer and optional additional additives. In a likewise preferred embodiment of the invention, the shell of the core-shell particle consists of at least two different shell (co)polymers, wherein at least one of said shell (co)polymers is a crosslinked (co)polymer.

As mentioned previously, the core of the core-shell particles comprises at least one (co)polymer of at least one ethylenically unsaturated monomer (A). This (co)polymer is called the core (co)polymer in the following.

In a preferred embodiment of the invention, the core (co)polymer is a homopolymer of an ethylenically mono-unsaturated monomer, in particular a homopolymer of an ethylenically mono-unsaturated, non-aromatic monomer, especially a homopolymer of ethyl (meth)acrylate, propyl (meth)acrylate, n-butyl (meth)acrylate, sec-butyl (meth)acrylate, tert-butyl (meth)acrylate or hexyl (meth)acrylate. A quite particularly preferred core (co)polymer is a homopolymer of n-butyl acrylate.

In so far as the core (co)polymer is a homopolymer of an ethylenically unsaturated monomer, then the term "homopolymer" in the context of the present invention is preferably understood to mean those polymers that essentially consist of only one ethylenically unsaturated monomer, i.e. the percentage fraction of an ethylenically unsaturated monomer in the total amount of all monomers that form the polymer in question is at least 98%.

Notwithstanding this, the core (co)polymer in polymerized form can also contain butadiene and/or mixtures of butadiene with other polymerizable monomers. For example, the core (co)polymer can be formed by copolymerizing butadiene and acrylonitrile.

In a further preferred embodiment of the invention, the core (co)polymer is a copolymer of at least two ethylenically unsaturated monomers (A), in particular a copolymer of at least two ethylenically, mono-unsaturated, non-aromatic monomers.

Furthermore, in a most preferred embodiment of the invention, the core of the core-shell particle consists only of a single core (co)polymer and optional additional additives. In a likewise preferred embodiment of the invention, the core of the core-shell particle consists of at least two different core (co)polymers.

As mentioned previously, the shell of the core-shell particle according to the invention comprises at least one crosslinked shell (co)polymer. In the context of the present invention, a crosslinked shell (co)polymer is absolutely essential because the stability of the shell of the core-shell particle according to the invention in the surrounding matrix is significantly increased by the crosslinking. Moreover, the swelling behavior of the shell of the core-shell particle according to the invention can be determined by the degree of crosslinking. In this regard, shell (co)polymers having good swellability often show a lower tendency to coagulation than comparable shell (co)polymers with lower swellability. However, in the context of the present invention, too high a swellability is undesirable if it leads to a dissolution, especially a complete dissolution, of the shell (co)polymer according to the invention in the surrounding matrix.

In another preferred embodiment of the invention, the core of the core-shell particle comprises at least one crosslinked core (co)polymer.

Accordingly, a crosslinked core (co)polymer is principally of particular advantage if the shell of the core-shell particle according to the invention is very permeable.

In the context of the present invention, a "crosslinked (co) polymer" is understood to mean especially a copolymer, in which more than 1%, preferably more than 1.5%, particularly preferably more than 2% and quite particularly more than 4% of monomer units of a chain are crosslinked with monomer units of another chain.

Crosslinked shell (co)polymers and/or crosslinked core (co)polymers are preferably obtained by adding a crosslinking agent during the manufacture of the core (co)polymer and/or of the shell (co)polymer.

In the context of the present invention, suitable crosslinking agents are preferably polymerizable monomers that possess at least two polymerizable groups per molecule, such as for example divinylstyrene. Di-, tri-, tetra- and/or pentaacrylates that can be selected for example from the group consisting of pentaerythritol tetraacrylate (PETTA), trimethylolpropane triacrylate (TMPTA), di-trimethylol propane tetraacrylate (DiTMPTTA), dipentaerythritol pentaacrylate (DiPEPA) or tripropylene glycol diacrylate (TPGDA) or any of their mixtures are also particularly suitable.

Notwithstanding this, crosslinked shell (co)polymers and/or crosslinked core (co)polymers can also be obtained by subsequent crosslinking of the relevant (co)polymers, for example by UV-, x-ray-, gamma- or electron beam radiation.

The shell (co)polymer can also be crosslinked by covalently binding the shell (co)polymer to the core of the core-shell particle according to the invention, wherein the covalent binding can be achieved for example by means of transfer reactions.

In a preferred embodiment of the invention, the shell of the core-shell particle therefore comprises at least one crosslinked (co)polymer (shell (co)polymer) that is manufactured by polymerization, in the presence of a crosslinking agent, of at least one ethylenically unsaturated monomer (B) that contains at least one aromatic group.

When manufacturing the shell (co)polymer, the crosslinking agent is added preferably in an amount of 0.01 to 2 wt. %, particularly preferably in an amount of 0.1 to 1 wt. %, based on the total amount of the at least one ethylenically unsaturated monomer (B).

In another preferred embodiment of the invention, the core of the core-shell particle comprises at least one (co)polymer (core (co)polymer) that is produced by radical emulsion polymerization of at least one ethylenically unsaturated monomer (A) optionally in the presence of a crosslinking agent.

In a most preferred embodiment of the invention, the core of the core-shell particle comprises at least one (co)polymer (core (co)polymer) that is produced by radical mini-emulsion polymerization of at least one ethylenically unsaturated monomer (A) optionally in the presence of a crosslinking agent.

When manufacturing the core (co)polymer, the crosslinking agent is added preferably in an amount of 0.01 to 2 wt. %, particularly preferably in an amount of 0.1 to 1 wt. %, based on the total amount of the at least one ethylenically unsaturated monomer (A).

Mini-emulsions can be understood to mean aqueous dispersions of stable oil droplets with droplet sizes of about 10 to about 600 nm which are obtained by intensive shearing of a system that comprises oil, water, a surfactant and a hydrophobe. The hydrophobes, which are essential for manufacturing stable mini-emulsions, are for example monomers that exhibit a low water-solubility. The hydrophobe suppresses mass transfer between the different oil droplets by osmotic forces (the Ostwald ripening), but immediately after the mini-emulsion formation the dispersion is only critically stabilized in regard to shocks from the particles, and the droplets themselves can always still grow in size due to further shocks and coalescence. For further details in regard to mini-emulsions and polymerizations in miniemulsions, reference is made to the article of K. Landfester, F. Tiarks, H.-P. Hentze, M. Antonietti "Polyaddition in miniemulsions: A new route to polymer dispersions" in Macromol. Chem. Phys. 201, 1-5 (2000), the contents of which are hereby incorporated by reference. In addition, reference is made to the publication cited therein E. D. Sudol, M. S. Es-Aasser, in: "Emulsion Polymerization and Emulsion Polymers", P. A. Lovell, M. S. El-Aasser, Eds., Chichester 1997, p. 699, the contents of which are hereby likewise incorporated by reference.

The microemulsion is manufactured in a manner known per se. Reference may be made to the already cited literature, namely the article of Landfester et al., the publication cited therein from Sudol et al. as well as the published applications WO 98/02466, DE 19628142 A1, DE 19628142 A1, DE 19628143 A1, DE 19628143 A1 and EP 818471 A1.

The mini-emulsion is manufactured in a simple and known manner by initially preparing an aqueous macro-emulsion that comprises at least one ethylenically unsaturated monomer (A) as well as the surfactant (surface-active substance).

After the mixture was homogenized and converted into a macro-emulsion, the thus prepared macro-emulsion was then converted in a typical manner known to the person skilled in the art, into a so-called mini-emulsion, a very stable type of emulsion, e.g. by treating the previously obtained macro-emulsion with ultra-sound, by high pressure homogenization or by means of a micro-fluidizer. The fine dispersion of the components is generally achieved by means of a high local energy input.

The inventively used mini-emulsion is an essentially aqueous emulsion of monomers stabilized by the surface active agent; the particle size of the emulsified droplets ranges from 10 nm to 600 nm, especially from 40 nm to 450 nm, preferably from 50 nm to 400 nm.

The diameters of the mini-emulsion droplets can be easily adjusted to the cited range, whereby a decisive parameter for this is the type and concentration of the employed surfactant. Thus, in direct mini-emulsions, smaller mini-emulsion droplets are obtained with ionic surfactants, such as sodium dodecyl sulfate (SDS), cetyltrimethylammonium bromide (CTMA-Br), than with non-ionic surfactants.

Mini-emulsion droplets can be regarded as stable nano reactors because diffusion processes are suppressed to the greatest possible extent by the hydrophobe as well as by the low polydispersion and the absence of micelles. The mini-emulsion method essentially differs in this point from the normal emulsion polymerization, which proceeds in a diffusion-controlled manner. Thus, monomers can be polymerized in mini-emulsions, the process then being a so-called mini-emulsion polymerization.

The use of the mini-emulsion polymerization process for manufacturing the core (co)polymer and thereby also the core of the core-shell particles according to the invention is highly advantageous, as firstly the size of the core of the core-shell particles according to the invention can be easily controlled by controlling the droplet size.

Secondly the mini-emulsion polymerization process allows additional additives to be incorporated into the core without problems, wherein the additives are preferably selected from organic and/or inorganic materials.

The mean particle diameter of the cores of the core-shell particles according to the invention is preferably between 30 and 500 nm, particularly preferably between 50 and 250 nm.

In a preferred embodiment, the core of the core-shell particles contains inorganic particles. In this regard the inorganic particles must have a particle size that is compatible with the intended application and the size of the core. The lower limit of the size of the inorganic particles is given firstly by their manufacturability and secondly by their effect on the material properties of the core.

A technical practical lower limit for the mean particle size of the inorganic particle is 5 nm, preferably 10 nm and especially 20 nm. The upper limit for the particle size is dictated by the mean particle size of the core of the core-shell particle according to the invention, which is why the upper limit of the mean particle size of the inorganic particles is usually selected such that the maximum dimension of the inorganic particle in each spatial direction is smaller than the mean particle diameter of the core of the core-shell particle according to the invention. In particular, depending on the core size, inorganic particles are preferred whose mean particle diameter is between 5 and 250 nm, preferably between 10 and 125 nm and especially between 20 and 60 nm.

The mean particle size ($D_{50}$ volume average) of the inorganic particles and the cores can be determined by conventional methods, for example light scattering. In this regard, "particles" are understood to mean those particles that are dispersed in the organic matrix. They can be agglomerates of smaller entities. The $D_{50}$ volume average is that point in the particle size distribution, at which 50 vol. % of the particles have a smaller diameter and 50 vol. % of the particles have a larger diameter. The mean particle size can be determined particularly preferably by means of an instrument of the type Microtrac UPA 250.

The maximum dimension of the inorganic particles in each spatial direction can be obtained by statistical analysis of (electron) micrographs.

The inorganic particles are preferably selected from oxides, hydroxides, carbonates and silicic acids or silicas. Titanium oxides, such as rutile or anatase, are particularly suitable oxides. Aluminum oxides or aluminum hydroxides can likewise be employed. Zinc oxides are also suitable. Carbonates of calcium and/or magnesium are preferably employed as the carbonates. Examples are chalk and dolomite. Mixed oxides/hydroxides such as for example basic aluminum oxides or basic zinc oxides can also represent the inorganic particles. Mixed carbonates/hydroxides, such as for example basic zinc carbonate, can also be used.

Further preferred inorganic particles are silicic acids or silicas. "Silicic acids" are (hydroxide group-containing) silicon dioxides that can be obtained for example from silicon halide compounds by pyrolysis or by hydrolysis. Salts of silicic acid with in particular alkaline earth metal can represent silicas. The naturally occurring alumosilicates, which can have fibrous or layered structures for example, are also suitable. Examples of them are bentonites. Calcium silicates such as for example wollastonite as well as chlorites are also suitable.

The inorganic particles are obtained in the cited particle sizes by for example grinding and/or sieving the particles down to the desired degree of dispersion.

In a preferred embodiment of the invention, the core of the core-shell particle further contains at least one compound selected from the group of the polyepoxides, polybenzoxazines, polyurethanes, polyesters, polyamides, phenolic resins, polyethers, polyimides, polybenzimidazoles, polyether ether ketones or polysulfones.

The core of the core-shell particle can also comprise a mixture of two or more of the cited compounds.

In this regard, the cited compounds can be present as a pure mixture and/or as a copolymer with the at least one core (co)polymer. It is advantageous to use the cited compounds because in this way the mechanical properties of the core can be adjusted in a controlled manner for a defined application or in regard to the other components of the polymerizable composition according to the invention.

The shell of the core-shell particles according to the invention can be modified or further functionalized by treatment with one or more compounds (functionalization reagent(s)). Functionalized core-shell particles can be produced in this way. They are particularly advantageous as the properties and surface characteristics of the core-shell particles according to the invention can be easily modified by functionalization. This enables for example the mechanical properties of the core-shell particles to be optimized in a controlled manner for a specific application. Likewise, the functionalization can achieve an improved bonding of the core-shell particles according to the invention to the benzoxazine matrix.

In this regard, the functionalization reagent is preferably selected from the group consisting of (meth)acrylates, acrylate-funktionalized benzoxazine compounds, epoxy compounds, silanes and epoxysilanes or from any of their mixtures.

Particularly preferred epoxysilanes in this context are compounds of the general formula (S-I),

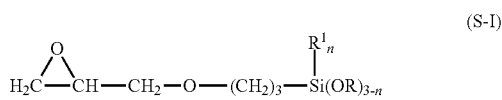

wherein R represents a linear or branched alkyl group containing 1 to 4 carbon atoms or an aryl group containing 6 to 12 carbon atoms and $R^1$ represents a linear or branched alkyl group containing 1 to 4 carbon atoms and n is equal to 0 or 1 or 2. 3-Glycidyloxypropyltrimethoxysilane (GLYMO), 3-glycidyloxypropyltriethoxysilane (GLYEO), 3-glycidyloxypropyltri-n-propoxysilane, 3-glycidyloxypropyltri-iso-propoxysilane, 3-glycidyloxypropyltri-n-butoxysilane and 3-glycidyloxypropyltri-iso-butoxysilane or their mixtures are particularly preferred. In the context of the present invention, a most preferred epoxysilane is 3-glycidyloxypropyltrimethoxysilane (GLYMO).

The shells of the core-shell particles according to the invention are preferably formed by means of seed polymerization. In seed polymerization, which is particularly suitable for manufacturing particles that are as monodisperse as possible, the inventive cores of the core-shell particles according to the invention are provided, wherein the particle size distribution of the cores is as homogeneous as possible. In this case the inventive cores are called the seed latex. At least one ethylenically unsaturated aromatic monomer is slowly added to the seed latex. The polymerization is carried out in such a way that the latex particles increase in volume while conserving the monodispersity of the system, but do not increase in number. The particle count is then proportional to the original amount, and a narrow particle size distribution is obtained. In a preferred embodiment of the invention, the particle diameters of the core-shell particles according to the invention are from 30 nm to 5000 nm, preferably from 100 to 1000 nm and particularly preferably from 400 to 600 nm, wherein the mean particle diameter is as defined previously.

The inventive cores and/or shells of the core-shell particles according to the invention each consist of either one layer or are optionally formed from more than one layer. The layers here each consist of at least one (co)polymer of at least one ethylenically unsaturated optionally aromatic monomer, wherein the individual layers of the core according to the invention and/or the shells according to the invention are arranged one on top of the other.

Inventive cores and/or shells having more than one layer can be formed for example in a multi-step process. In a first step, the first layer is formed by copolymerizing a first ethylenically unsaturated optionally aromatic monomer or a mixture of different ethylenically unsaturated optionally aromatic monomers. In a second step, a second layer is formed by copolymerizing a second ethylenically unsaturated optionally aromatic monomer or a mixture of different ethylenically unsaturated optionally aromatic monomers in the presence of the first layer, wherein the layers are concentrically superimposed on one another.

Additional layers can also be optionally formed analogously to the described formation of the second layer.

In a preferred embodiment of the invention, the inventive core and/or the inventive shell of the core-shell particles according to the invention consists of more than one layer. In a particularly preferred embodiment of the invention, only the inventive shell of the core-shell particles according to the invention consists of more than one layer.

By means of the different layers, the physical or mechanical properties of the core-shell particle can be matched to a relevant application need in a particularly advantageous manner. Thus for example, it is possible to form core-shell particles that consist of a plurality of layers of different (co)polymers, wherein said (co)polymers differ for example in their glass transition temperatures or in their mechanical data, thereby enabling a particularly effective impact modification to be achieved for each benzoxazine matrix that is used.

In a quite particularly preferred embodiment of the invention, the external layer of the shell of the core-shell particle comprises a polymerized ethylenically unsaturated monomer (B) that contains at least one aromatic group.

As the external layer of the core-shell particles is in direct contact with the surrounding benzoxazine matrix, said core-shell particles exhibit a very low tendency to coagulation, especially in N-alkyl- and/or N-alkenyl-benzoxazine compounds and their polymerization products.

In a preferred embodiment of the invention, the proportion of the inventive cores is between 50 and 95 wt. %, preferably between 60 and 90 wt. % and more particularly between 70 and 85 wt. % and in a further preferred embodiment of the invention the proportion of the inventive shells is between 5 and 50 wt. %, preferably between 10 and 40 wt. % and more particularly between 15 and 30 wt. %, each based on the total amount of the core-shell particles.

In a likewise preferred embodiment of the invention, the polymerizable composition according to the invention comprises the core-shell particles according to the invention in amounts of 0.001 to 20 wt. %, preferably 1 to 15 wt. % and most preferably 5 to 10 wt. %, each based on the total amount of the polymerizable composition.

In a further embodiment of the present invention, the polymerizable composition consists of at least one of the abovementioned polymerizable benzoxazine compounds core-shell particles of the present invention, wherein the core of the core-shell particle comprises at least one (co)polymer of at least one ethylenically unsaturated monomer (A) and the shell of the core-shell particle comprises at least one crosslinked (co)polymer of at least one ethylenically unsaturated monomer (B), wherein the ethylenically unsaturated monomer (B) contains at least one aromatic group and optionally one or more additives that are selected from fillers, stabilizers, cure accelerators, antioxidants, adhesion promoters, rheological agents, thickeners, binders, solvents, radical scavengers, catalysts, reactive diluents, plasticizers, flame retardants, additional impact modifying additives, dispersants, pigments, colorants, emulsifiers (surfactants), corrosion inhibitors.

A further subject matter of the present invention is a method for the manufacture of the inventive core-shell particles comprising the following steps:

a) radical mini-emulsion polymerization of at least one ethylenically unsaturated monomer (A) in the presence of a crosslinking agent for manufacturing the core;

b) radical polymerization of at least one ethylenically unsaturated monomer in the presence of the cores manufactures in step a) and optionally a crosslinking agent;

c) separation of the core-shell particles obtained in step b), wherein step a) and/or step b) can be repeated as often as desired before carrying out the subsequent step, with the proviso that the external layer of the core-shell particles is formed by radical polymerization of at least one ethylenically unsaturated monomer (B) that contains at least one aromatic group.

The at least one ethylenically unsaturated monomer (A) and the at least one ethylenically unsaturated monomer (B) in the process according to the invention are understood to mean the monomers that have already been defined above.

The ethylenically unsaturated monomer in step b) in the process according to the invention is understood to mean the inventive ethylenically unsaturated monomer (A) and/or the inventive ethylenically unsaturated monomer (B).

The mini-emulsion used in the process according to the invention is initially provided or manufactured in step a) of the process according to the invention.

The exact description of the mini-emulsion as well as its manufacture and its advantages can be found in the embodiments stated above, to which reference is here explicitly made.

The radical polymerization reactions in step a) (mini-emulsion polymerization) and step b) of the process according to the invention are preferably initiated by a polymerization starter.

The quantity of polymerization starter is generally about 0.0001% to about 3.0%, especially 0.001% to 0.1% of the total weight of the mixture that is used for manufacturing the relevant polymer. Conventional polymerization starters or their mixtures (such as thermal starters, redox starters and the like) are suitable for use in the relevant polymerization reaction. Exemplary suitable starters include the following: t-butyl hydroperoxide, di-t-butyl peroxide, benzoyl peroxide, benzoyl hydroperoxide, 2,4-dichlorobenzoyl peroxide, t-butyl peracetate, sodium/potassium/ammonium peroxy disulfate, azo-bis-isobutyric acid dinitrile, isopropyl peroxycarbonate, cumyl hydroperoxide-sodium metabisulfite, cumyl hydroperoxide-iron(II)sulfate and the like. Preferred starters also include water-soluble azo compounds.

In this regard the polymerization starter is preferably added at temperatures between 40° C. and 80° C.

The use of the mini-emulsion polymerization process for manufacturing the core (co)polymer and thereby also the core of the core-shell particles according to the invention is highly advantageous, as firstly the size of the core of the core-shell particles according to the invention can be easily controlled by controlling the droplet size.

Secondly the mini-emulsion polymerization process allows additional additives to be incorporated into the core without problems, wherein the additives are preferably selected from organic and/or inorganic materials.

The separation of the core-shell particles carried out in step c) is preferably accomplished by filtration and/or centrifugation.

Another subject matter of the present invention is a process for manufacturing the inventive polymerizable composition, comprising the steps:
- a) addition of a water-miscible organic solvent to an aqueous dispersion of inventive core-shell particles,
- b) addition of a solution of an inventive polymerizable benzoxazine compound in a water-miscible organic solvent and
- c) separation from water and from the water-miscible organic solvent.

In the context of the present invention, exemplary suitable water-miscible organic solvents are alcohols, such as e.g. methanol, ethanol, isopropanol, propanol, tert-butanol, sec-butanol, isobutanol or glycol. Further advantageous water-miscible organic solvents are ethers, such as e.g. THF, 1,2-dimethoxyethane, diethylene glycol or dioxane.

THF is a particularly suitable water-miscible organic solvent.

The term "water-miscible organic solvent" is also understood to mean mixtures of different water-miscible organic solvents.

The separation from water and from water-miscible organic solvent cited in step c) is preferably carried out by rotational evaporation under reduced pressure.

In the above described process, no macroscopic phase separation of the different immiscible solvents occurs when manufacturing the polymerizable composition. In this way, the phase separation steps that are required in conventional processes can be dispensed with, in which as a rule, are separated water-immiscible, frequently environmentally hazardous, organic solvents, such as for example methyl isobutyl ketone.

A further subject matter of the present invention is the polymerization product of the polymerizable composition according to the invention.

The polymerization of the polymerizable benzoxazine compound or the mixture of different polymerizable benzoxazine compounds can take place at increased temperatures according to a self-initiating mechanism (thermal polymerization) or by adding cationic initiators.

Suitable exemplary cationic initiators are Lewis acids or other cationic initiators, such as for example metal halides, organometallic reagents, such as metalloporphyrins, methyl tosylates, methyl triflates or trifluorosulfonic acids. Basic reagents can also be used for initiating the polymerization of the polymerizable benzoxazine compound or the mixture of different polymerizable benzoxazine compounds. Suitable exemplary reagents can be selected from imidazole or imidazole derivatives. The thermal polymerization of the polymerizable composition according to the invention is preferably carried out at temperatures of 150° C. to 300° C., especially at temperatures of 160° C. to 220° C. The polymerization temperature can also be lower when the abovementioned initiators and/or reagents are used.

In a preferred embodiment of the invention, the polymerization product according to the invention contains a layer or a bundle of fibers, wherein the fibers are treated with a polymerizable composition according to the invention prior to curing (polymerization). Accordingly, a further subject matter of the present invention is a process for manufacturing a polymerization product of the polymerizable composition according to the invention, wherein said composition contains a layer or a bundle of fibers and the fibers are treated with the polymerizable composition according to the invention prior to curing. The process according to the invention includes the steps:
- a) preparation of a layer or a bundle of fibers;
- b) preparation of the polymerizable composition according to the invention;
- c) production of a composite system by treating a layer or a bundle of fibers with the polymerizable composition according to the invention;
- d) optionally removing an excess amount of the polymerizable composition from the composite system, wherein said polymerization product is obtained, in that the composite system is exposed to increased temperature and increased pressure.

Said fibers are preferably selected from glass fibers, carbon fibers, Aramid fibers, boron fibers, aluminum oxide fibers, silicon carbide fibers. A mixture of two or more of these fibers can be used. For manufacturing a product with lower density and higher durability, the use of carbon fibers is particularly preferred.

In the context of the present invention, the layer or the bundle of fibers does not have a specific shape or composition, and thus e.g. long fibers aligned in a parallel direction, towpregs, wovens (fabrics), mats, knitted fabric, braids can be used.

Due to their low density and high structural strength, the composite systems, which are manufactured according to said process in the form of fiber-reinforced composite materials, in particular in the form of prepregs or towpregs, can be used for example in aircraft construction or in the automobile industry.

A further subject matter of the present invention is an adhesive, sealant or coating, containing the polymerizable composition according to the invention.

Another subject matter of the present invention is the use of the inventive core-shell particles for the impact modification of a polymerization product, comprising at least one of the above described polymerizable benzoxazine compounds in polymerized form.

N-alkyl- or N-alkenyl-benzoxazine compounds are particularly preferred as the core-shell particles according to the invention can be particularly easily formulated with, and exhibit a good compatibility with said benzoxazine compounds.

The core-shell particles according to the invention are essentially homogeneously dispersed in the polymerization products, especially of the N-alkyl- or N-alkenyl-benzoxazine compounds, and demonstrate a very low tendency to coagulation. A particularly effective impact modification of said benzoxazines is achieved in this way.

EXAMPLES

1. Manufacture of the Core-Shell Particles
1.1 Manufacture of the Cores
Reagents Used:

| | |
|---|---|
| butyl acrylate | Acros 99%, CAS 141-32-2 |
| ammonium lauryl sulfate | Disponil ALS 33, 33% in water Cognis |
| tripropylene glycol diacrylate | Laromer TPGDA, BASF SE |
| potassium peroxydisulfate | Merck |

A mixture of 0.92 g Disponil ALS 33 in 241 g water was homogenized with vigorous stirring in a beaker. To this mixture was added a mixture of 60.20 g butyl acrylate and 0.061 g tripropylene glycol diacrylate in 4.02 g water and the resulting mixture was homogenized with vigorous stirring. The homogenized mixture was treated with a Microfluidizer (Microfluidics Co.) 4 times 8000 psi for manufacturing the miniemulsion.

A nitrogen flow was fed into the resulting mixture for 25 min at room temperature. After heating to 75° C., 0.063 g potassium peroxydisulfate in 2.21 g water were added. After 4.5 h at room temperature the reaction was ended and the reaction mixture was cooled down to 40° C. and filtered, whereby all particles with a particle size>80 µm were removed.

The gravimetrically determined solids content of the resulting solution was 13.4%. A mean particle size ($D_{50}$ volume average) of the resulting cores of 115 nm was determined by dynamic light scattering, measured with a Microtrac UPA 250.

1.2 Manufacture of the Core-Shell Particles
1.2.1 Manufacture of the Core-Shell Particles#1
Reagents Used:

| Reaction product 1.1 | |
|---|---|
| benzyl methacrylate | Acros 96%, CAS 2495-37-6 |
| tripropylene glycol diacrylate | Laromer TPGDA, BASF SE |
| Ammonium peroxydisulfate | Merck |

To 200 g of the reaction product obtained in 1.1 were added at room temperature 25.3 g benzyl methacrylate and 0.07 g tripropylene glycol diacrylate. The mixture was stirred under a $N_2$ atmosphere at room temperature for 20 h. The reaction mixture was then heated to 55° C. and 0.8 g ammonium peroxydisulfate was added. After stirring for 30 min at 65° C. the reaction was ended, the reaction mixture was cooled down to 40° C. and filtered, whereby all particles with a particle size>80 µm were removed.

A mean particle size ($D_{50}$ volume average) of the resulting core-shell particles#1 of 544 nm was determined by dynamic light scattering, measured with a Microtrac UPA 250.

1.2.2 Manufacture of the Core-Shell Particles#2
Reagents Used:

| Reaction product 1.1 | |
|---|---|
| benzyl methacrylate | Acros 96%, CAS 2495-37-6 |
| styrene | Acros 99%, CAS 100-42-5 |
| tripropylene glycol diacrylate | Laromer TPGDA, BASF SE |
| Ammonium peroxydisulfate | Merck |

To 140 g of the reaction product obtained in 1.1 were added at room temperature 15.0 g benzyl methacrylate and 0.5 g tripropylene glycol diacrylate. The mixture was stirred under a $N_2$ atmosphere at room temperature for 20 h. The reaction mixture was then heated to 55° C. and 0.6 g ammonium peroxydisulfate was added. After stirring for 30 min at 65° C. the reaction was ended, the reaction mixture was cooled down to 40° C. and filtered, whereby all particles with a particle size>80 µm were removed.

A mean particle size ($D_{50}$ volume average) of the resulting core-shell particles#2 of 525 nm was determined by dynamic light scattering, measured with a Microtrac UPA 250.

1.3 Manufacture of the Polymerizable Composition

In order to manufacture the polymerizable composition, THF was added to the aqueous solution of the core-shell particles obtained in 1.2, such that a 1:1 to 1:4 mixture of water: THF was obtained. At least one polymerizable benzoxazine compound was then added with stirring. The resulting mixture was freed under reduced pressure of all volatile components (e.g. water) and then degassed. In the above described process, no macroscopic phase separation of the different immiscible solvents occurred when manufacturing the polymerizable composition. In this way, the phase separation steps that are required in conventional processes can be dispensed with, in which as a rule, are separated water-immiscible, frequently environmentally hazardous, organic solvents, such as for example methyl isobutyl ketone (see for example EP 1 623 533 A1).

Consequently, principally from the point of view of efficiency and environmentally, the described manufacturing process is advantageous.

When manufacturing the polymerizable composition, the quantity of each aqueous solution of the core-shell particles was selected such that the desired fraction of core-shell particles in the polymerizable composition was obtained after removing all volatile components. The following N-alkyl-benzoxazine compound and N-alkenyl-benzoxazine compound were used as the polymerizable benzoxazine compounds:

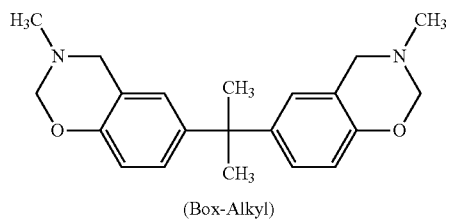
(Box-Alkyl)

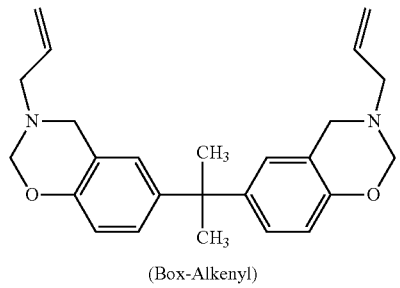
(Box-Alkenyl)

The polymerizable compositions listed in Table 1 were manufactured according to the above described process

TABLE 1

Polymerizable compositions containing benzoxazine
compounds and core-shell particles

| Composition wt. % | Box-alkyl | Box-alkenyl | Core-shell particles#1 | Core-shell particles#2 |
|---|---|---|---|---|
| Sample 1 (reference) | 100 | — | — | — |
| Sample 2 | 95 | — | 5 | — |
| Sample 3 (reference) | — | 100 | — | — |
| Sample 4 | — | 95 | — | 5 |

1.4 Mechanical Data of the Cured Polymerizable Composition

The polymerizable compositions were thermally cured in molds within 3 h at 180° C. in an air-circulation drying oven. The samples were then removed from the molds and cooled down to room temperature.

The samples were then characterized with the following analytical methods.

The glass transition temperatures were determined by means of dynamic mechanical thermo analysis (DMTA) on specimens sized 35 mm×10 mm×3.2 mm. The specimens were heated from 25° C. to the 250° C. final temperature with a heating rate of 10° C./min. Each glass transition temperature was obtained from the maximum value of the loss modulus vs temperature diagram.

The flexural strength and the flexural modulus were measured in accordance with ASTM $D_{790}$, wherein for each specimen sized 90 mm×12.7 mm×3.2 mm, span=50.8 mm a speed=1.27 mm/min was used.

The critical stress intensity factor K1c was determined in accordance with ASTM D5045-96 using the "single edge notch bending (SENB)", wherein 56 mm×12.7 mm×3.2 mm specimens were used.

The mechanical data of the cured polymerizable compositions are presented in Table 2.

TABLE 2

Mechanical data of the polymerizable compositions

| | Sample | | | |
|---|---|---|---|---|
| Data | 1 (ref) | 2 | 3 (ref) | 4 |
| DMTA-$T_g$ (E') [° C.] | 187 | 178 | 190 | 197 |
| Flexural strength [MPa] | 100 | 100 | 85 | 100 |
| Flexural modulus [MPa] | 4200 | 4125 | 3675 | 3615 |
| K1c [MPa m$^{0.5}$] | 0.85 | 1.02 | 0.61 | 0.70 |

The mechanical data of the cured polymerizable compositions show that an effective impact modification can be achieved with the use of the inventive core-shell particles for both N-alkyl-benzoxazines and also N-alkenyl-benzoxazines. It is noteworthy in this regard that the glass transition temperature, the flexural strength and the flexural modulus of the cured compositions remain approximately constant.

A comparable impact modification is not achieved when core-shell particles are used, in which the shells, especially the external layer of the shells, do not contain a (co)polymer that is formed from at least one ethylenically unsaturated monomer that contains at least one aromatic group.

What is claimed is:

1. A polymerizable composition, comprising
   a) at least one polymerizable benzoxazine compound and
   b) core-shell particles, wherein the core of the core-shell particle comprises at least one (co)polymer of at least one ethylenically unsaturated monomer (A) and the shell of the core-shell particle comprises at least one crosslinked (co)polymer of at least one ethylenically unsaturated monomer (B), wherein the ethylenically unsaturated monomer (B) includes at least one aromatic group and is selected from aromatic esters of (meth) acrylic acids.

2. The polymerizable composition according to claim 1 wherein the benzoxazine compound is selected from N-alkyl- or N-alkenyl-benzoxazine compounds or from their mixtures.

3. The polymerizable composition according to claim 1 wherein the ethylenically unsaturated monomer (A) is selected from ethylenically mono-unsaturated monomers.

4. The polymerizable composition according to claim 1 wherein the core of the core-shell particle comprises at least one (co)polymer that is produced by radical mini-emulsion polymerization of at least one ethylenically unsaturated monomer (A) optionally in the presence of a crosslinking agent.

5. The polymerizable composition according to claim 1 wherein the shell of the core-shell particle comprises at least one crosslinked (co)polymer that is produced by polymerization of at least one ethylenically unsaturated monomer (B) that contains an aromatic group, in the presence of at least one crosslinking agent.

6. The polymerizable composition according to claim 1 wherein the core, the shell or both, of the core-shell particle are formed of more than one layer.

7. The polymerizable composition according to claim 1 wherein the fraction of the core is between 50 and 95 wt. % and the fraction of the shell is between 5 and 50 wt. %, each based on the total amount of the core-shell particle.

8. The polymerizable composition according to claim 1 wherein the polymerizable composition comprises the core-shell particles in amounts of 0.001 to 10 wt. % based on the total amount of the polymerizable composition.

9. A process for manufacturing a polymerizable composition according to claim 1, comprising the steps:
   a) addition of a water-miscible organic solvent to an aqueous dispersion of core-shell particles,
   b) addition of a solution of a polymerizable benzoxazine compound in a water-miscible organic solvent to the aqueous dispersion of core-shell particles in the water-miscible organic solvent from step a), and
   c) separation of the polymerizable composition from water and from the water-miscible organic solvent.

10. A polymerization product of the polymerizable composition according to claim 1.

11. The polymerization product according to claim 10 wherein said polymerization product contains a layer or a bundle of fibers, wherein the fibers are treated with the polymerizable composition prior to curing.

12. The process for the manufacture of a polymerization product according to claim 11, including the steps:
   a) preparation of a layer or a bundle of fibers;
   b) preparation of the polymerizable composition;
   c) production of a composite system by treating a layer or a bundle of fibers with the polymerizable composition;
   d) optionally removing an excess amount of the polymerizable composition from the composite system, wherein said polymerization product is obtained by exposing the composite system to increased temperature and increased pressure.

13. An adhesive, sealant or coating, comprising a polymerizable composition according to claim 1.

14. A process of using core-shell particles that are a component of a polymerizable composition according to claim 1 for modifying the impact resistance of a polymerization product, comprising the steps:
   a) providing at least one polymerizable benzoxazine compound,
   b) providing the core-shell particles,
   c) mixing the core-shell particles in the at least one polymerizable benzoxazine compound to form a polymerizable composition according to claim 1,
   wherein the polymerizable composition modifies the impact resistance of the polymerization product thereof.

15. A polymerizable composition, comprising
   a) at least one polymerizable benzoxazine compound and
   b) a toughening component consisting of core-shell particles, wherein the core of the core-shell particle comprises at least one (co)polymer of at least one ethylenically unsaturated monomer (A) and the shell of the core-shell particle comprises at least one crosslinked (co)polymer of at least one ethylenically unsaturated monomer (B), wherein the ethylenically unsaturated monomer (B) includes at least one aromatic group; and wherein the ethylenically unsaturated monomer (B) is selected from aromatic esters of (meth)acrylic acids.

16. In a toughened polymerizable composition, comprising a) at least one polymerizable benzoxazine compound and b) a toughening component consisting of core-shell particles, wherein the core of the core-shell particle comprises at least one (co)polymer of at least one ethylenically unsaturated monomer (A) and the shell of the core-shell particle comprises at least one crosslinked (co)polymer of at least one ethylenically unsaturated monomer (B), wherein the ethylenically unsaturated monomer (B) includes at least one aromatic group, wherein the improvement comprises that the ethylenically unsaturated monomer (B) is selected from aromatic esters of (meth)acrylic acids.

* * * * *

UNITED STATES PATENT AND TRADEMARK OFFICE
CERTIFICATE OF CORRECTION

PATENT NO. : 8,716,377 B2  
APPLICATION NO. : 12/942301  
DATED : May 6, 2014  
INVENTOR(S) : Andreas Taden et al.

Page 1 of 1

It is certified that error appears in the above-identified patent and that said Letters Patent is hereby corrected as shown below:

In the specification,

Column 7, line 19: Change "R4", to -- $R^4$ --.

Column 7, line 38: Change "CO=S" to -- C=O, S --.

Column 10, line 13: Before "GY-281''", insert -- " --.

Column 11, line 7: After "the", delete "to the".

Column 11, line 24: Change "RV" to -- $R^V$ --.

Column 11, line 42: Change "*-$NR^B$-" to -- *-$NR^a$-* --.

Column 12, line 49: Change "M-ethyl-(meth)" to -- N-ethyl-(meth) --.

Column 14, line 5: Change "copolymer" to -- (co)polymer --.

Column 16, line 11: Change "miniemulsions" to -- mini-emulsions --.

Column 16, line 13: Change "miniemulsions" to -- mini-emulsions --.

Column 16, line 22: Change "microemulsion" to -- micro-emulsion --.

Column 18, line 28: Change "funktionalized" to -- functionalized --.

Column 19, line 66: Before "at", insert -- - --.

Column 20, line 1: Before "core-shell", insert -- - --.

Column 20, line 8: Before "optionally", insert -- - --.

Column 24, line 67: After "process", insert -- . --.

Column 25, line 31: Change "$D_{790}$" to -- D790 --.

Signed and Sealed this  
Fifth Day of July, 2016

Michelle K. Lee  
*Director of the United States Patent and Trademark Office*